United States Patent

Ross, Jr.

[11] Patent Number: 5,941,268
[45] Date of Patent: Aug. 24, 1999

[54] TANK SAFETY VALVE

[76] Inventor: Donald P. Ross, Jr., 2124 N. Arnoult Dr., Metairie, La. 70001

[21] Appl. No.: 08/705,289
[22] Filed: Aug. 29, 1996
[51] Int. Cl.⁶ .................................................. F16K 17/40
[52] U.S. Cl. ........................................... 137/68.14; 137/71
[58] Field of Search ............................. 137/68.11, 68.14, 137/71

[56] References Cited

U.S. PATENT DOCUMENTS

| | | | |
|---|---|---|---|
| 1,411,483 | 4/1922 | Floyd | 137/68.14 |
| 1,698,616 | 1/1929 | Woodham | 137/71 X |
| 2,945,503 | 7/1960 | Atkinson | 137/68.14 |
| 3,618,626 | 11/1971 | Russo | 137/68.14 |
| 3,645,286 | 2/1972 | Follett | 137/68.14 |
| 3,930,517 | 1/1976 | Gagala | 137/71 X |
| 4,077,422 | 3/1978 | Brinkley et al. | 137/68.14 |
| 4,370,997 | 2/1983 | Braithwaite et al. | 137/70 |
| 4,562,852 | 1/1986 | Britt | 137/68.14 |
| 4,587,987 | 5/1986 | West | 137/70 |
| 4,907,617 | 3/1990 | Whalen | 137/68.11 X |
| 4,955,404 | 9/1990 | Pitzen | 137/70 |
| 5,103,853 | 4/1992 | McGushion et al. | 137/68.11 X |
| 5,144,973 | 9/1992 | Green et al. | 137/68.14 X |
| 5,265,641 | 11/1993 | Anderson et al. | 137/70 |

*Primary Examiner*—John Rivell
*Attorney, Agent, or Firm*—Patent & Trademark Services; Thomas Zack; Joseph H. McGlynn

[57] ABSTRACT

A tank safety valve which is used to seal off fluid or gas flow from the tank when an accident occurs. If the tank is damaged, such as by accidentally dropping the tank, it is most likely that the valve, which protrudes from the tank, (and is therefore most susceptible to damage) will allow the contents of the tank to leak. In order to prevent this type of leakage (from a broken valve), the body of the valve is provided with a weakened section. Internally, the valve is provided with a spring biased plunger or check valve plug which will be released when the weakened section is broken. The plunger and check valve plug will be moved upward by the force of a spring to block the opening which leads out of the tank.

1 Claim, 1 Drawing Sheet

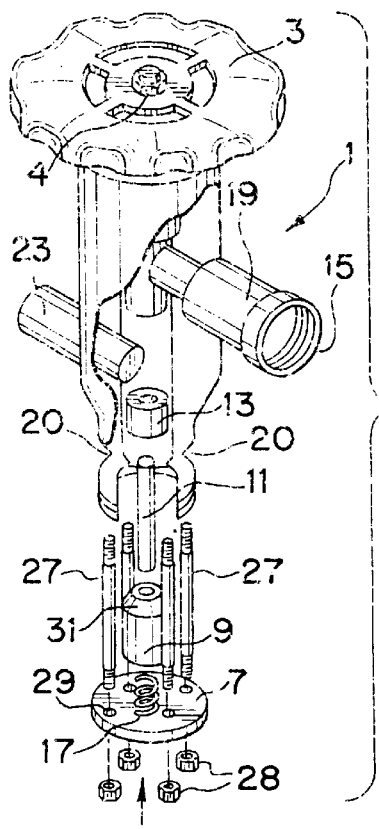
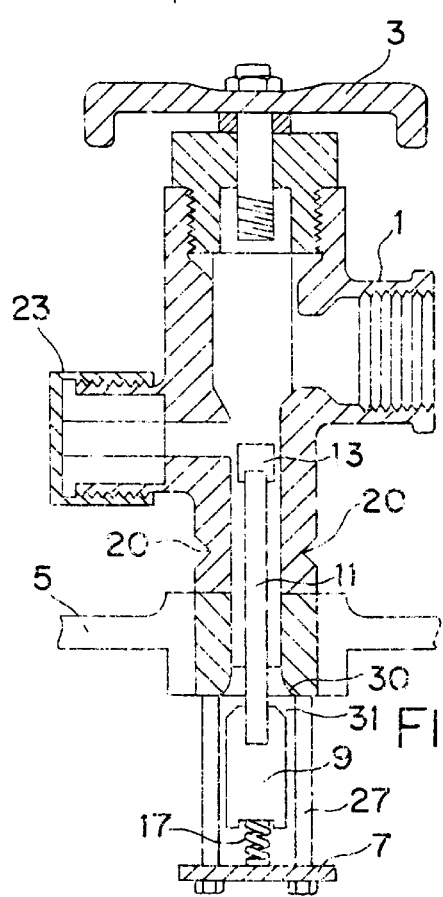
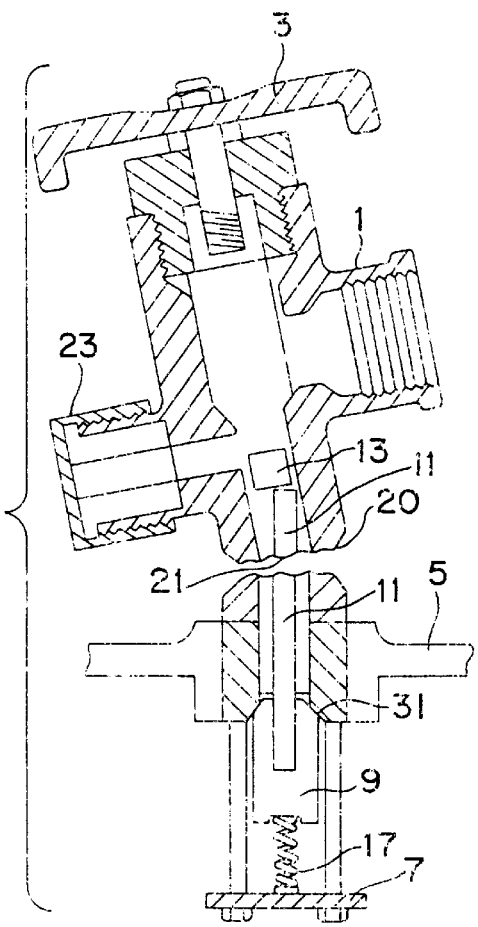
FIG. 1
FIG. 2
FIG. 3

TANK SAFETY VALVE

BACKGROUND OF THE INVENTION

Containers with gases or liquids typically have a main valve handle to control the dispensing of these products. Accidental breakage of the valve may result in dangerous or unhealthy release of the confined products. To ameliorate this possibility a safety back up valve has been proposed which is released when an internal breakable plunger releases a normally held spring biased check valve plug. The check valve's plug release acts to close the fluid flow from the main valve.

DESCRIPTION OF THE PRIOR ART

Safety and check valves to prevent leakage from a main valve in the event of an emergency are well known. Many are actuated when gas or confined fluid pressure within a container exceeded some level. This triggering level may be dependent on the setting of the pressure regulating means as in U.S. Pat. No. 4,370,997 to Braithwaite et al., In U.S. Pat. No. 4,587,987 to West, a relief valve element is disengaged from its seat at a selected relief pressure by shearing a linkage. The Pitzen invention (U.S. Pat. No. 4,955,404) utilizes a cap placed over a leaking valve with the cap having a fusible sealable substance solidified in it. And in U.S. Pat. No. 5,265,641 to Anderson et al., a ball valve normally floats in a flowing liquid or gas fluid and is forced against and blocks an exit opening when the pressure on it exceeds a selected limit. The present invention provides a tank safety valve which is actuated when a protruding blocking safety vent plug is damaged to release a normally held check valve plug which then seals the fluid flow.

SUMMARY OF THE INVENTION

A tank safety valve which is used to seal off fluid flow from the tank when an accident occurs. If the valve is damaged, such as by accidentally dropping the tank, it is most likely that the valve, which protrudes from the tank, (and is therefore most susceptible to damage) will allow the contents of the tank to leak. In order to prevent this type of leakage (from a broken valve), the body of the valve is provided with a weakened section. Internally, the valve is provided with a spring biased plunger or check valve plug which will be released when the weakened section is broken. The plunger or check valve plug will be moved upward by the force of a spring to block the opening which leads out of the tank.

It is the primary object of the present invention to provide for an improved tank safety valve.

Another object is to provide for an improved tank safety valve whose safety mechanism is actuated by damage to the valve.

These and other objects and advantages of the present invention will become apparent to readers from a consideration of the ensuing description and the accompanying drawings.

BRIEF DESCRIPTION OF THE DRAWINGS

FIG. 1 is a partial exploded perspective view of the present invention.

FIG. 2 is a cross sectional side view of the safety valve prior to any damage.

FIG. 3 shows a cross sectional side view of the safety valve after it has been damaged.

DESCRIPTION OF THE PREFERRED EMBODIMENT

FIG. 1 is a exploded perspective view of the invention's preferred embodiment having a partial cut away section showing some of the valves inner mechanism. The valve 1 of the present invention utilizes a control handle 3 which is mounted on the valve by a nut 4. The handle is conventional and is used to open and close the exit 19 which has an aperture 15 to permit the contents of the tank 5 (shown partially in FIGS. 2 and 3) to be removed under normal circumstances. The valve also has a safety vent 23. All of these above mentioned elements are conventional and are shown merely for illustration purposes. Changes in the above mentioned elements can be made without departing from the scope of the invention. For example, the valve exit or safety vent may be different than shown in FIG. 1, or can be attached to the valve at different locations.

Mounted within the internal passage way of the valve 1, which allows the contents of the tank 5 to be removed under normal circumstances, is a plunger rod 11 which is mounted in the top of a check valve plug 9. How the plunger rod 11 is positioned in the top of a check valve plug 9 is not critical to the present invention, and a simple mounting, such as a friction fit will suffice. Attached to the top of the plunger rod 11 is a plunger rod stabilizer 13 which will help hold the plunger rod 11 in contact with the valve plug 9 and at the same time keep the spring 17 in a compressed state.

The plunger rod 11, plunger rod stabilizer 13, valve plug 9 and spring 17 are mounted internally of the valve 1 by a plurality of rods 27 which have opposite threaded ends. One of the threaded ends will pass through apertures 29 in plate 7 and will be secured thereto by nuts 28. The other threaded ends will be threaded into internal threaded apertures (not shown) within the valve.

As shown in FIGS. 1–3, the valve body is weakened at 20 so if the valve is accidentally damaged it will break at this preselected point (see FIG. 3). It should be noted that the weakened section is shown as an undercut portion in the drawings, however, any method of weakening a section of the valve body can be used without departing from the scope of the invention.

In use, the valve would be attached to a container or tank 5, as shown in FIG. 2. The check valve plug 9 will be held down against the bias of the spring 17 by the force of the plunger rod 11 and the plunger rod stabilizer 13. If the valve is damaged, the valve body will break at the weakened section 20 and the rod will break at 21 (see FIG. 3), which will allow the spring 17 to force the check valve plug 9 upward. The upper end of the check valve plug 9 has a taper 31 which will match a similar taper 30 on the inner wall of the valve. When the valve body breaks, the spring will force the taper 31, on the check valve plug 9, into engagement with the taper 30, and therefore seal the internal passageway through the valve. This will prevent any contents within the container 5 from leaking through the broken valve.

The majority of the components of the present invention may be manufactured using the lost wax method of casting. The lost wax method of casting, also known as investing casting, is a process which starts with an exact model of the component to be cast fabricated from wood, metal or plastic material. A rubber mold is made of the piece and wax is cast into the mold making an exact replica in hard wax.

Next, the wax model is placed in a box filled with material known as "green sand". The sand is compacted around the wax component, with a wax shaft leading from the wax model to the outside of the sand form. The sand is allowed to dry.

The entire box is placed in an oven which melts or burns out the wax model, leaving a hollow cavity in the green sand which is an exact duplicate of the melted wax. Molten brass is poured into the hole left by the melted wax shaft, allowing the brass to flow into the cavity. Once the brass solidifies, the and is removed and cleaned from the brass piece. The brass piece is checked for voids, rough edge and polished after inspection for these and other potential defects. Details such as threads or fine markings are performed as a secondary machining procedure The investment casting process is performed by a number of factories in the U.S., Canada and Mexico. The procedure involves automatic and semi-automatic manufacturing processes.

A newer process called the investment foam casting process is very much similar to the lost wax process. The wax is replaced with a high density Styrofoam which has been created by injecting foam into a highly detailed mold. The Styrofoam shape is coated with liquid ceramic before being cast. The process is otherwise almost identical to the wax process described above.

The springs utilized for the proper operation of the tank safety valve may be found as "off the shelf" items. The Thomas Register is a good source for locating commercial sources for such components. Any additional conventional items used in the fluid or gas handling art, such as rubber or plastics sealing or packing components may also be available as off the shelf items Although the Tank Safety Valve and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A safety valve adapted to seal off fluid flow from a fluid container comprising:

a casing having an interior fluid passageway, said casing having an entrance opening adapted to be secured to a fluid container, said casing having an exit opening, said interior fluid passageway communicating between said entrance opening and said exit opening, control valve means for controlling movement of fluid from said entrance opening to said exit opening, and a safety valve assembly interposed in said fluid passageway, said safety valve assembly having means mounted in said fluid passageway, said safety valve assembly being movable from a first position to a second position, when in said first position, said safety valve assembly permits the movement of fluid from said entrance opening to said exit opening, and when in said second position, said safety valve assembly prevents movement of fluid from said entrance opening to said exit opening, said safety valve assembly comprises a plug having an opening in a top portion thereof, and a spring engaging a bottom portion of said plug, and means for holding said plug in a first position against a force exerted by said spring, said means comprising a breakable rod which engages in said opening in said top portion of said plug, and a stabilizing element which is detachably engaged with a top of said breakable rod, breakable means on said casing for allowing said safety valve assembly to move from said first position to a second position, and wherein said breakable means is a weakened portion of said casing, and wherein said top portion of said plug is tapered, a portion of said fluid passageway has a complimentary tapered portion which is positioned adjacent said tapered top portion of said plug, whereby when said breakable means on said casing allows said safety valve assembly to move from said first position to said second position, said tapered top portion of said plug engages said tapered portion of said fluid passageway and seals said fluid passageway.

* * * * *